June 17, 1969 — J. H. DOYLE — 3,449,768
ARTIFICIAL SENSE ORGAN
Original Filed Nov. 26, 1963
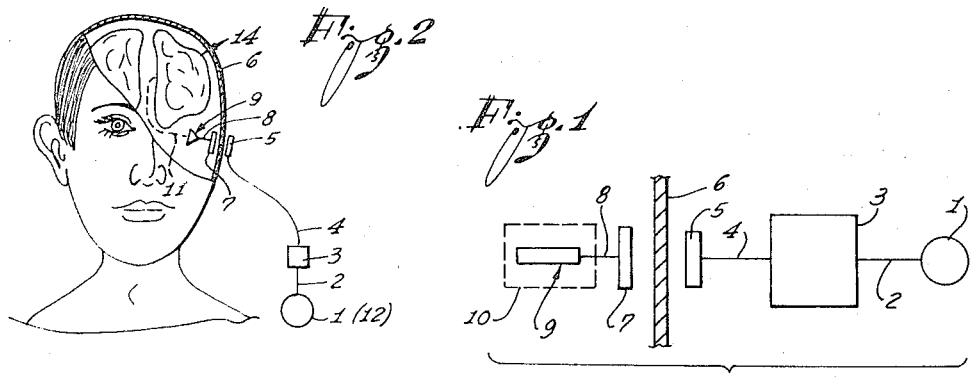
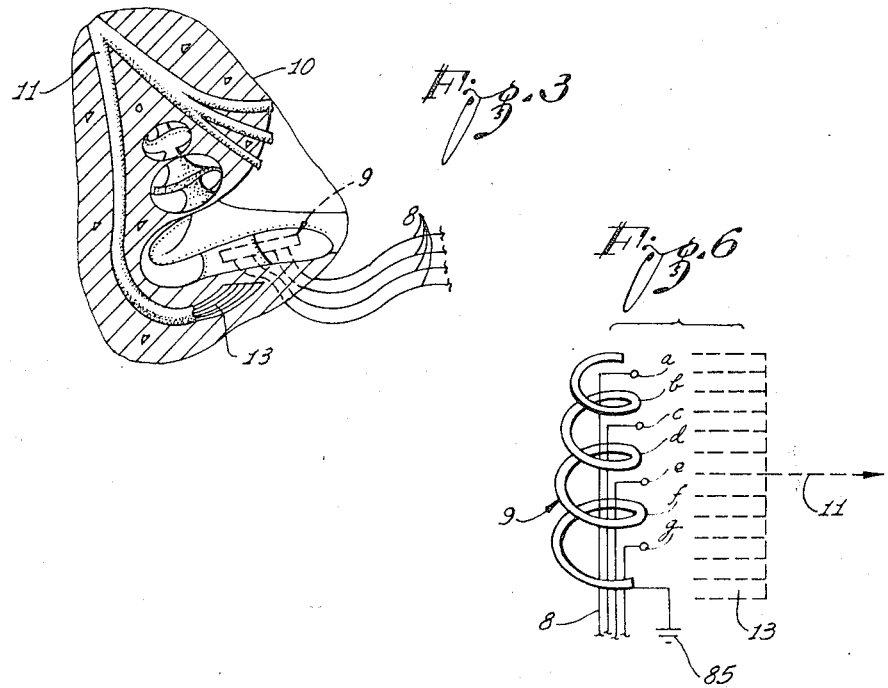
INVENTOR
James H. Doyle
Attorneys

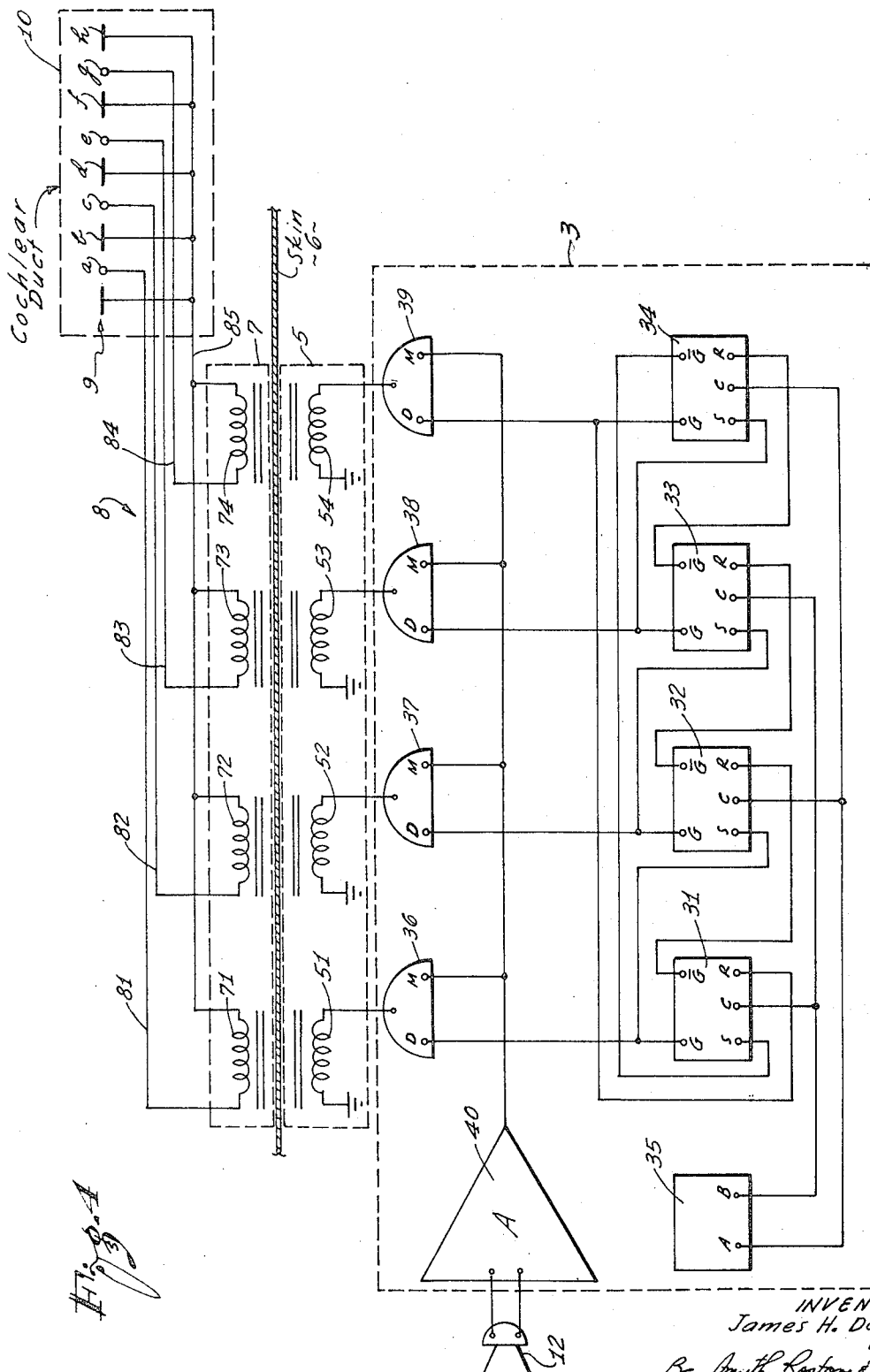

INVENTOR.
James H. Doyle

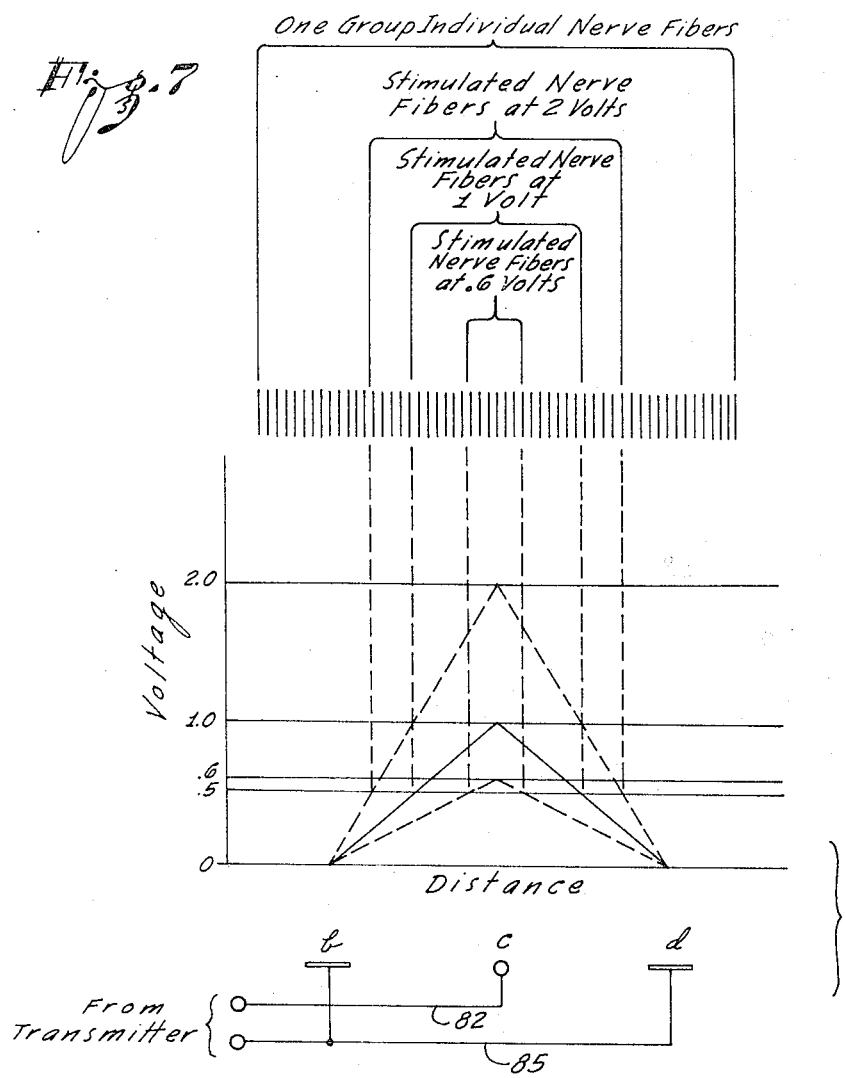

INVENTOR
James H. Doyle

Attorneys

United States Patent Office 3,449,768
Patented June 17, 1969

3,449,768
ARTIFICIAL SENSE ORGAN
James H. Doyle, Garden Grove, Calif., assignor of one-half to Earle W. Ballentine, Portuguese Bend, Calif.
Continuation of application Ser. No. 326,124, Nov. 26, 1963. This application Dec. 27, 1966, Ser. No. 605,087
Int. Cl. A61f 1/00, 9/08, 11/04
U.S. Cl. 3—1                                                        15 Claims

ABSTRACT OF THE DISCLOSURE

A tested device is described for stimulating the auditory nerve using electrodes energized by pulses in a cyclic pattern, commensurate with the recovery time of nerve fibers. The pulses being modulated in accordance with the audio signal; the electrodes are spaced so that the potential differences between them control the number of nerve fibers stimulated.

This application is a continuation of application Ser. No. 326,124, filed Nov. 26, 1963, now abandoned, which, inturn, was a continuation-in-part application of application Ser. No. 131,844, filed Aug. 16, 1961, now abandoned. The invention relates to a method, system and device for transforming physical sensations, such as sight and sound, into an ordered code pattern of electrical signals corresponding to the neuro-potentials in an animal system, with means for bringing these potentials into the living body and effectively applying them to receptor centers such as nerve bundles, the brain, or muscle tissue.

It is well known that brain and nerve messages within a living animal body are electrical in nature. It is also known that electrical stimuli applied to receptor centers such as the brain, nerves, or muscles cause a reaction dependent upon the electrical characteristics of the stimuli. Further, it is known that devices exist which are designed to aid the physical senses such as sight and hearing. In the case of hearing, these devices are limited in that the outer and inner ear, though defective, must still retain at least a fraction of hearing capability. In the case of total loss of sight, these devices are limited in that audible signals are utilized to warn of obstacles.

However, it is now widely accepted that the electrical impulses in a neurological system are comprised of discrete pulses or quanta of electrical energy, and not of continuous analog signals as is commonly supposed. Not generally known is the relation between an analog electrical signal, as from a microphone, and the complex pulse-type neuro-potentials which are produced in a nerve bundle, as by an ear, when said microphone and said ear are activated by the same sound.

It is a primary object of the present invention to provide a new system and method for stimulating groups or bundles of nerve fibers without requiring the participation of the body organ normally translating received signals into nerve stimuli.

It is another object of the present invention to provide a system which will stimulate directly the auditory nerve, or the optic nerve, or the brain with an ordered code of neuro-potentials and restore a degree of hearing or sight, respectively, when the organs of sound or sight are totally defective.

It is a further object to provide a system which will translate external physical sensations, such as, for example, sight and sound, into a particular and ordered code of neuro-potentials, different from the common analog signals and similar to those produced by a normal ear when stimulated by sound or a normal eye when stimulated by light.

It is another object to provide a system which transforms scenes or sounds into a corresponding electrical analog signal and includes a coding device for converting the analog signal into a corresponding pulsed train of coded neuro-potentials, a transmitting coupler, a receiving coupler, and a matrix for impressing these neuro-potentials upon a brain or nerve bundle.

It is also an object of the present invention to provide a system which will stimulate directly the auditory nerve and restore a degree of hearing when the organ of hearing, except the auditory nerve or at least a portion thereof, is totally defective.

It is also an object to provide an electrode system within the cochlea for stimulating individual nerve fibers of the auditory nerve therein, generating electrical pulses which are transmitted to the brain in a coded pulse pattern, whereby the number of pulses arriving simultaneously at the brain will bear a direct relationship to sound amplitude and the time sequence of their arrival will bear a direct relationship to sound pitch or frequency, said volume and pitch being the basic parameters of intelligible sound.

It is also an object to provide a means for stimulating any number (N) of different fiber groups of the auditory nerve, phased in N spaced time intervals within a period of approximately one millisecond, the natural recovery time of a single nerve fiber after an applied stimulus.

It is a further object of the present invention to provide an electrode system positioned near the brain area controlling sight, thereby stimulating or scanning groups of brain cells in a cyclic manner inducing therein a plurality of electrical gradient fields whose variations result from a coded pulse signal generated by a neuro-potential generator, wherein the number of pulses arriving at any of the many groups of brain cells governs the gradation of perception from dark to bright of that particular cell group, said generator being modulated by an analog electrical signal from an electronic camera, as a television camera, thereby producing a degree of sight perception.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIGURE 1 illustrates a block diagram of a system for transferring and converting analog signals, as received, into encoded pulses, according to a preferred embodiment of the present invention;

FIG. 2 illustrates utilization of a system as shown in FIG. 1 by a subject;

FIG. 3 illustrates an electrode system for applying electrical stimulating systems to the cochlea;

FIG. 4 illustrates a block diagram, partially with a detailed wiring circuit of a system for generating signals to be applied as shown in FIG. 3;

FIG. 6 illustrates somewhat schematically the structure of an electrode system to be used for stimulating nerve-fiber ends;

FIG. 7 illustrates schematically electrical gradient fields for stimulating groups of nerve fibers, which fields are being developed by an electrode system shown in FIG. 6;

Figure 5A:
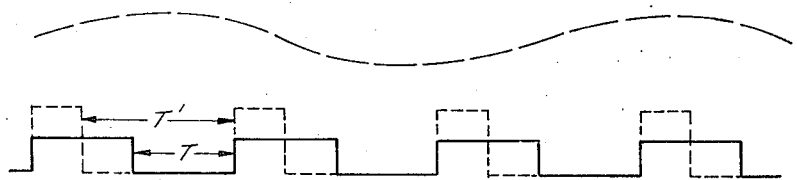
FIGS. 5a through 5f illustrate pulse diagrams, plotted against time, of pulses developed in the system shown in FIG. 4.
Figure 5B:
Figure 5C:
Figure 5D:
Figure 5E:

In FIG. 1, a transducer 1 converts physical phenomena representing perceptible sensations to analog electrical signals which are applied via conductor 2 to a neuro-potential generator 3. Neuro-potential generator 3 converts the analog electrical signals to an ordered code signal consisting of a pulse train of specific electrical characteristics such that the code signal is similar to the natural neuro-potentials found in a living animal system. The output from the neuro-potential generator is directed via conductor 4 to an electrical coupling unit 5 which is positioned adjacent to an outer skin segment 6. A biologically implantable electrical coupling unit 7 is positioned within the animal body, such that units 5 and 7 are electrically and mutually coupled. The code signal induced in unit 7 by coupling action is directed via conductor 8 to an electrode system 9 of such a configuration that the ordered code signal is effectively impressed upon a nerve bundle, a brain, or a muscle tissue at a receptor center 10.

FIGS. 1, 2, and 3 serve to illustrate how the inventive system can be used as a replacement for the outer and middle ear. Sound is transformed into an analog electrical signal by microphone 12 and directed via conductor 2 to neuro-potential generator 3. The neuro-poential generates a plurality of independent, coded pulse trains (four in the illustration), each bearing a specific phase relationship to the others and each modulated by the analog signal. The four channels are directed via conductor 4 to the coupling unit 5 suitably positioned, as on the head near the ear. The coded signal is coupled through the skin tissue 6 to an implanted coupling unit 7 within the head. Coupling units 5 and 7 are comprised of four transmitter and receiver sets, such that each transmitter in 5 is electrically coupled to a corresponding receiver in 7. The coded pulse trains generated in coupled unit 7 are directed via conductor 8 to an electrode system such as a matrix 9 suitably positioned near the auditory nerve bundle 13, as within the cochlea 10, said matrix thereby creating an electrical gradient field in the vicinity of the auditory nerve termination in the cochlea.

Proceeding now to the detailed description of the several components employed, reference is first being made to FIG. 4. The neuro-potential generator 3 illustrated therein comprises a ring counter composed of four conventional flip-flop stages 31, 32, 33, and 34 with gated inputs. There is a source of clock pulses 35 connected to the ring counter for shifting operation.

The four flip-flop stages are interconnected and connected to the clock-pulse source. Clock-pulse terminal C of stages 32 and 34 connects to terminal A of source 35, whereas terminal C of stages 31 and 33 connects to terminal B of source 35. Gating terminals S and R of any stage connect to terminals G and $\overline{G}$, respectively, of the preceding stage, except for the connection between stages 31 and 34, wherein the connection is a reversed one for recycling. At a rate of twice the clock-pulse frequency, the flip-flops are successively turned on; and after they have all been turned on, they are being turned off in similar succession, completing one ring-counter cycle. Accordingly, the periods of time when the flip-flops are in the "on" state overlap. This overlapping is not mandatory, and the flip-flops can be interconnected in shift-register fashion with recycling, so that only one flip-flop at a time is in the "on" state and is turned off when the succeeding flip-flop is turned on. It is decisive only that the time between changes of state of the flip-flop be not less than the recovery time of a nerve, since this is an A.C. coupled system.

Each flip-flop has one output terminal G connected to one input terminal D of a gate. Accordingly, there are provided four gates 36, 37, 38, and 39, respectively, connected to flip-flops 31, 32, 33, and 34. The respective signals applied from the flip-flops to the gates serve as gating signals thereof. Each gate has a signal input terminal M jointly connected to the output side of an electronic amplifier 40. The amplifier 40 has its input side connected to microphone 12. Amplifier 40 has an adjustable D.C. bias, and the output signal is an A.C. signal having its magnitude modulated in accordance with the audio signals as picked up by the microphone 12.

FIG. 5 illustrates schematically how the electrical audio signals as developed by amplifier 40 are encoded by means of the gating network 36, 37, 38, and 39 in the neuro-potential generator 3. FIG. 5e illustrates for purposes of reference the clock-pulse train drawn from source 35. Assuming that a momentary output of amplifier 40 is represented by the dotted line plotted for all of the four diagrams 5a, 5b, 5c, and 5d, the several gates permit passage of only restricted portions of the wave train. Gate 36 permits passage of an audio signal train during the voltage blocks shown in diagram 5a; gate 37 permits passage of such audio signals during the voltage blocks shown in FIG. 5b, which latter voltage blocks are being phase shifted relative to the pulses passed through gate 36 by the width of one clock pulse from clock-pulse source 35. FIGS. 5c and 5d, respectively, illustrate the output pulses applied to the gating terminals of gates 38 and 39.

The pulse frequencies of the pulse trains at the several gates are all similar, and are identical with the ring-counter frequency. The important period is the pause T between succeeding voltage blocks of one train, since it must not be shorter than the natural recovery time of each individual auditory nerve fiber, which recovery time is measured from the time of stimulating a nerve fiber to the earliest time permitting restimulation of the same nerve fiber. This recovery time is about 1 millisecond, rarely shorter. In the present example, this period of time T is equal to twice the oscillation period of the clock-pulse source, or one-half the period of the ring-counter cycle. The ring-counter cycle frequency thus should not exceed 500 c.p.s. in this embodiment.

The FIGS. 5a, 5b, 5c, and 5d also illustrate pulse blocks in dashed lines, representing the four pulse trains developed by each flip-flop in case four flip-flops are interconnected to form a shift-register type ring counter. In this case, the critical period of time is denoted with T'. As one can see from the diagrams, the pulses of the several trains do not overlap. As will be explained more fully below, the pulses effective in each train must stay on long enough to suffice for the appropriate number of nerve stimulations.

The output side of each gate can be called a channel, and each such channel receives a train of spaced pulses during the gated-open periods in FIGS. 5a to 5d. It is a significant feature of the present invention that the trains of pulses in the various channels are kept apart and insulated from each other throughout their further transmission.

The gates feed their respective output signals through wires 2 to four transformer primary windings 51, 52, 53, and 54, which transformer primary windings constitute the external coupling and transmission unit 5. Each such primary winding may be wound around a strip of sheet iron to increase the available inductive field for transmission. As stated above, the external coupling or transmission unit 5, as composed of the primaries 51 to 54 with individual core strips, will be placed close to the skin on the head, preferably implanted very close to the secondary. Each primary winding with core constitutes a transmitter for the coded signal as furnished by the respective gate and channel. It will be appreciated that the average amplitude level of the pulses in each pulse train as received by the transmitter-primary winding is adjustable by the D.C. bias in amplifier 40.

As stated above, receiver sets are being implanted beneath the skin tissue 6 to constitute the receiver unit 7.

In the present embodiment, the receiver unit 7 comprises four transformer secondary windings 71, 72, 73, and 74, individually wound on an iron strip and individually coupled for transformer action to the primary windings 51, 52, 53, and 54, respectively. These four transformer secondary windings constitute the four receiver sets, respectively receiving signals representing the individual trains of pulses.

The transformer secondary windings 71, 72, 73, and 75 have one side of each interconnected to a common connection wire 85, while the respective other side of each of the transformer secondary windings is connected to wires 81, 82, 83, and 84, respectively. Wires 81 through 85 are all insulated from each other, and they constitute the conductor 8 supplying the signals as received to the electrode system 9, to be inserted into the cochlea 10 as schematically indicated in FIG. 4.

An example of such an electrode system is illustrated in FIG. 6. The connection wire 85 serves to furnish neutral or reference potential and is wound helically and conically about the four other wires 81, 82, 83, and 84. Wire 85 is "grounded"; that is to say, it is kept at constant body potential, such as, for example, the potential at the cochlear entrance, at the adjacent bone structure, etc. Each of the wires 81 to 84 terminates in an electrode $a$, $c$, $e$, and $g$, which electrodes may be constituted simply by the blank ends of wires 81, 82, 83, and 84, respectively. Adjacent and in between two such electrodes, respectively, the insulation of the wire 85 is removed to form shielding and return-path electrodes $b$, $d$, $f$, and $h$ of common potential.

This electrode assembly is placed into the cochlea to become situated along and adjacent the nerve-fiber ends therein. The interaction of the electrodes with a group of such nerve fibers will be explained best with reference to FIG. 7.

Upon application of an electrical signal, such as a short pulse of a particular amplitude to wire 82, an electric gradient field is being developed between electrode $c$ and electrodes $b$ and $d$. The diagram in FIG. 7 shows the field-voltage as developed at both sides of electrode $c$ for various voltages, such as 0.6, 1.0 and 2.0, applied thereto. If a gradient field of 0.5 volt (threshold) is required to stimulate or fire any nerve at all, at 0.6 volt only a small group of nerve fibers will be fired, which group of nerve fibers is located directly adjacent electrode $c$. If the signal pulse applied to electrode $c$ develops a 1-volt gradient field, the number of nerves fired by such a signal is correspondingly large, and a 2-volt gradient field fires a still larger number of nerves. It is readily understood that the gradient field as developed between the electrodes is related to the number of nerves fired by a substantially logarithmic function, which is a correct relationship and represents the relationship between sound volume and volume perception with a healthy ear.

Figure 5F:
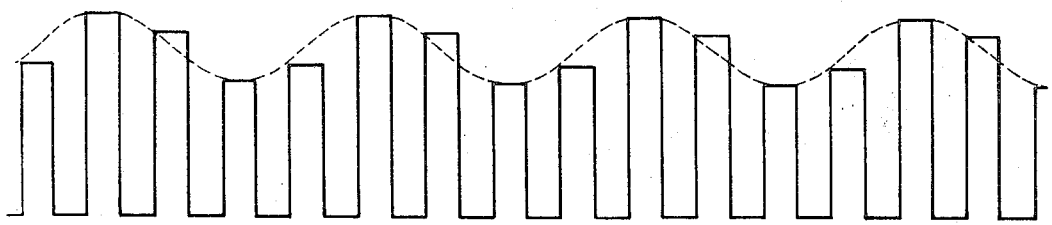

Considering the example above, FIG. 5f illustrates a train of pulses conceivably developed at the output side of gate 37 upon applying a sound wave, of the character of the dashed lines, to the microphone 12. Such a train of pulses is now being transmitted through transformer windings 52 and 72 and into wire 82. For each pulse of the train as applied, a number of nerve fibers will be fired, depending upon the amplitude of each pulse. It will be observed that the nerve fibers directly adjacent an electrode of variable potential $c$ will be fired with each pulse, but nerve fibers more adjacent to the shielding electrodes such as $b$ and $d$ will only be fired by some of the pulses. Each individual nerve adjacent the entire electrode assembly will thus be fired according to a pattern having a degree of regularity that is decreasing with the distance of the nerve from an electrode of variable potential $c$. It is a salient feature of the invention that all nerve fibers, fired by the various trains of pulses along the entire electrode assembly, receive signals which the brain may use to recompose the original sound signal proper as to amplitude and frequency (or volume and pitch) and as would be received by a microphone or healthy ear.

Experiments have shown the following. For instance, a single channel may be used, with the pulses applied thereto having constant amplitude. In this case, a tone will be perceived having a pitch which is a function of the rate of pulse recurrence, provided the pulse-train frequency is not higher than is permissible for nerve recovery. The same signal may be applied to the other channels, one channel at a time, but the patient will not distinguish one signal from the others. This confirms the fact that the nerve fibers are nonspecific indeed.

If all of the four channels are being activated in a regular cycle and by pulses of constant amplitude, the "tone" corresponding to the frequency of each pulse train will be less perceptible, so that upon transmission of speech or other desired sound, the pulse-train frequency will not be noticed as a disturbing background perception.

The electrode system introduces stimulation of nerve fibers by way of a double code. The first code includes the breaking up or multiplexing of an analog sensory signal such as a sound wave into several pulse trains, with the time elapsing between succeeding pulses not to exceed the nerve-recovery time. The pulse-train frequency in the aforedescribed embodiment is similar for all channels, which results from employment of a common clock-pulse source of constant frequency and of a regular ring counter for successive and periodic channel activation. Such similarity in frequency in each channel is not mandatory but preferred, for reasons of simplifying the apparatus employed.

A signal, as effective in any channel, is comprised of a train of equally spaced pulses, but still of variable amplitude. A pair of electrodes furnishes a gradient field as the second encoding in that the spatial distribution of such a gradient field determines the number of nerve fibers fired simultaneously. The amplitude of one individual pulse applied to the group of nerves available for firing is converted into a number of nerves fired, so that for each such individual pulse there is a true analog-digital conversion.

The electrode system thus operates as a switching and triggering device to energize nerve fibers substantially by an on-off principle. The number of fibers momentarily fired during occurrence of any clock pulse is representative of the momentary magnitude of an audio wave. The successive numbers of nerve fibers fired during successive clock pulses represent the audio wave as far as pitch and volume are concerned. The temporal summation of the firing of nerves is done by the brain, translating the varying numbers of successive nerve firings as sound volume and pitch.

It is a principal discovery leading to the present invention that the brain distinguishes pitch by determining recurring firing rates of like numbers of nerve fibers without requiring that it be the same nerve fibers which are being fired. The number of channels employed is principally arbitrary and is determined primarily by considerations of sound fidelity. A single channel naturally would be restricted to audio frequencies of oscillation periods longer than the recovery time. Such a restriction practically renders the system devoid of any practical use. The larger the number of channels, the more pulses can be transmitted per recovery time period. With sixteen channels, speech can be encoded adequately in all respects. Still, with four channels, patients were already able to distinguish words.

It should be mentioned that an electrode of variable potential, such as $c$, requires only one electrode of fixed potential to set up a gradient field. The field set up by the electrodes as shown in FIG. 7 does not have to be symmetrical. However, it is essential that any variable and stimulating potential as applied to one electrode shall not stimulate those nerve fibers which are in the reach of stimulation of the other variable potential electrodes. For this purpose, the electrodes of fixed potential are destined additionally to separate electrically the electrodes of variable potential from each other, so as to provide for a shielding effect. Accordingly, the shielding insures that all nerve fibers which have been stimulated can recover undisturbed by any stray field from another electrode of variable potential and pertaining to a different channel.

It will further be appreciated that the shape of the electrodes as well as the distance between adjacent electrodes has a bearing on the number of nerves fired. Accordingly, the relationship of the amplitude of the gradient field to the number of nerves fired, though basically logarithmic, depends on the electrode structure as parameters of the logarithmic function. By employing one variable-potential electrode flanked by two shielding electrodes, one has altogether five parameters for selection: the shape of each of the three electrodes, and the two distances that the variable potential electrode has from the two shielding electrodes.

Figure 8:
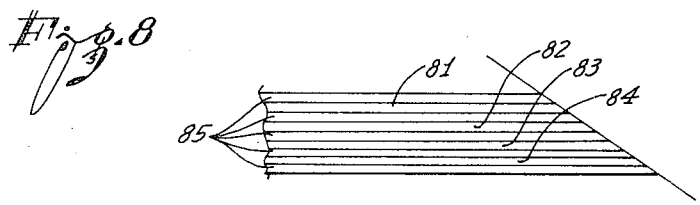
FIG. 8 illustrates in top elevation a modified electrode system for electrical nerve stimulation.

FIG. 8 illustrates a modification of the electrode system to be introduced into the cochlea. There is shown a plurality of altogether nine individually insulated wires, positioned to be substantially parallel and defining a common plane. These wires are cut off at an acute angle with regard to their extension, with the plane of cutting having at least a transversely oriented component relative to the said common plane. The exposed but still mutually insulated portions of the wires define the electrode system proper.

In the above-described system, it is shown that the encoding, from a different point of view, is carried out together with the distribution of the coded pulses into the different channels. From a different point of view, each channel receives a train of pulses at ring-counter frequency, critically determined by the individual nerve-recovery time. Each such pulse train is amplitude modulated in accordance with an audio analog signal as picked up by a microphone.

Such amplitude modulation is not mandatory and can be substituted by a pulse-width modulation. The number of nerves fired by a given electrode system does not solely depend on the amplitude of the pulses fed to the electrodes, but for a given amplitude the number of nerves fired can be varied by varying the duration of the pulse. Such a variation, of course, must be limited so as not to induce pain. However, a pulse-width modulation is possible as long as it is being limited accordingly. Pulse-width modulation can be carried out, as shown in principle in FIG. 9, by frequency-modulating the clock-pulses derived from source 35 with the output signal of the microphone 12. The frequency modulator 91 feeds its output as trigger to a ring counter 93, now feeding pulses of variable width to adding members 36', 37' 38', and 39'. A potentiometer 92 furnishes a variable bias for adjustment of the pulse height as needed. With such a system, precisely the same number of fibers per pulse can be fired as compared with the amplitude modulation described above. A pulse of given amplitude and duration may fire precisely the same number of nerve fibers as a pulse of larger amplitude and shorter duration or as a pulse of smaller amplitude and longer duration, this being a matter of suitable adjustment, so that amplitude and pulse-width modulation produce similar results as far as number and sequence of nerve firings are concerned.

Figure 9:
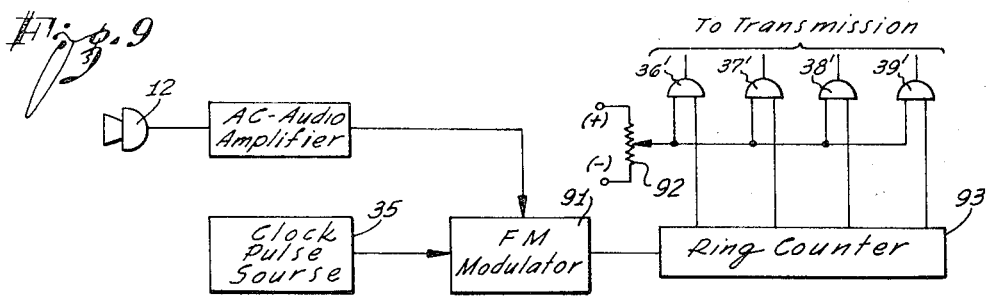
FIGS. 9 and 10 illustrate schematically block diagrams of modifications of the system shown in FIG. 4 to employ different modes of pulse modulation.
Figure 10:
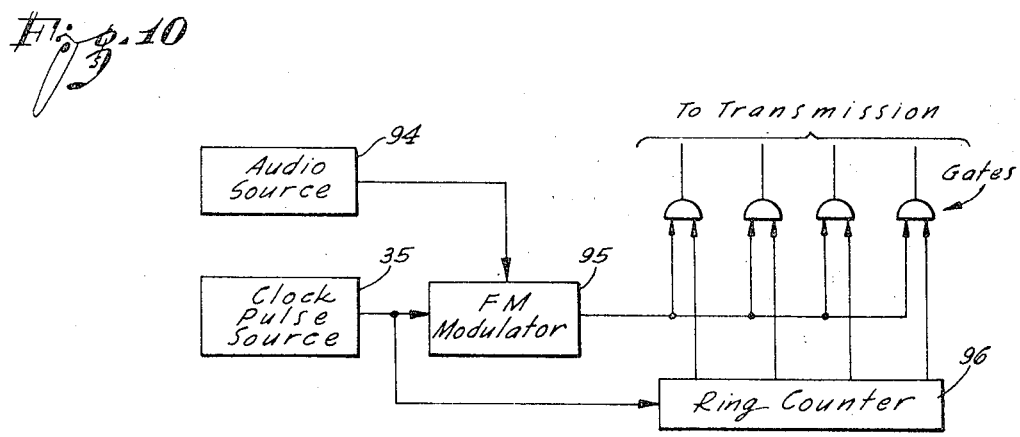

The embodiment of FIG. 9 already shows that modulation and channel distribution need not be carried out by the same element. In FIG. 10 it is further developed that the modulation and channel distribution do not have to be functionally related. FIG. 10 shows that the clock-pulse frequency is being frequency-modulated in a modulator 95 and by audio signals drawn from an audio-signal source 94. The frequency-modulated train of clock pulses is then being passed to the gates for distribution to the various channels. The individual channels will still be gated-open through a ring counter 96 and at a frequency which is the carrier or clock-pulse frequency divided by the number of channels; but each pulse permitted to pass is of a duration shorter than the period of opening each channel, and the phase position of such a pulse within the period of channel opening is representative of the frequency modulation. As long as the time from the closing of a channel to its reopening does not exceed the nerve-recovery time, the period of channel opening can be used fully for frequency-modulation of the pulse trains as they pass through the different channels.

It is important to note that any differential in the sequential firings of particular nerve fiber will be interpreted by the brain in terms of pitch variations, which fact basically renders all known methods of pulse modulation applicable. The method employed for pulse-train distribution to different portions in the cochlea insures that no nerve fiber will be fired more often than permissible in view of the recovery time acquired for each nerve. However, the brain is responsive to the totality of all simultaneous as well as sequential nerve firings, so that a varying delay in between successive nerve firings at different cochlear portions will be "demodulated" by the brain as varying pitch.

In the embodiment described above, the various pulse trains were transmitted through the skin by transformer action in that the primary winding was located externally, while the secondary windings were implanted beneath the skin, so that the coupling was effected through flux lines which penetrated the skin without irritating the tissue. It is, of course, possible to employ other methods and devices for the transfer of the signals from the outside to the receivers beneath the skin. For example, infrared rays are known to penetrate the skin without irritating same. Accordingly, the transmitter may be an infrared light source, and the receiver will then be a photoelectric cell which is particularly responsive to infrared bands. Actually, visible light rays can be used readily, since they penetrate the skin without being absorbed excessively. It should be mentioned that the energy to be transmitted is quite low, since the electric currents flowing in the system beneath the skin are very small, so that any attenuation of the transmission of energy by the skin tissue is no impediment to the usefulness of the inventive apparatus.

In order to improve the efficiency of power and energy transmission, it might be advisable to tune the receivers beneath the skin to a frequency so that each voltage developed across a secondary winding is increased by resonance and passive oscillator action, now directly effective in the channel transmitting the developed signal to the electrode system.

One could also use direct sound transmission, whereby piezoelectric crystals are being implanted beneath the skin as receivers. In this case, the ring counter and the gates need to be provided only for multiplexing and channeling portions of sound signals. The sound signals are being picked up by a microphone, are A.C. amplified, and reproduced by loudspeaker-type elements attached to the skin adjacent the implanted piezoelectric crystals.

In all these various modes of transmission, the critical point is the separation of the pulse trains in each channel, since "cross talk" among the several channels could cause energization of a channel during a nerve-recovery period for the nerves served by such a channel.

Figure 11:
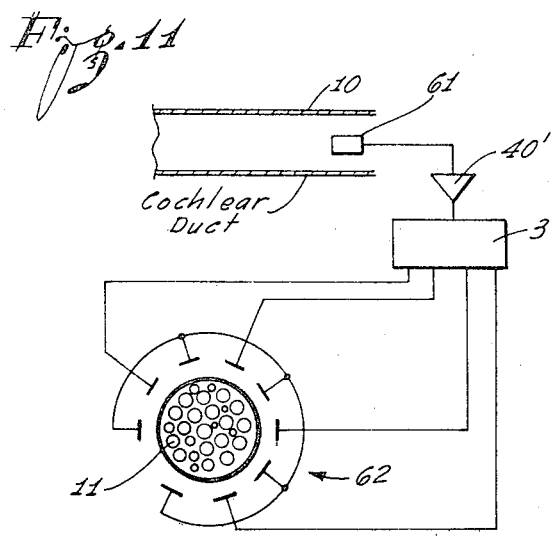
FIG. 11 illustrates schematically a block diagram of a system for direct stimulation of the auditory nerve using the outer ear for sound perception.

In FIG. 11, there is shown a device which, in effect, does not require any external equipment except a power source, and the entire electronic miniaturized network can be implanted beneath the skin. In particular, this device will find utility when the outer ear itself is not damaged and the inner ear is capable of producing neurophonic potentials. In this case, sound will be received by the outer ear, and corresponding electric signals will be developed in the cochlea.

A probe 61 picks up this electrical analog signal in the cochlea, which signal is fed to an amplifier 40' and to a neuro-potential generator 3 of the character described, now being also implanted beneath the skin tissue. Accordingly, no transmission device of the type including elements 5 and 7 in FIG. 4 is needed, but the four channels of the neuro-potential generator feed directly to an electrode system 62, partially enclosing directly the auditory nerve 11. The gradient field set up between adjacent electrodes again stimulates nerve fibers as aforedescribed. A nerve fiber does not have to be stimulated at the fiber end, but can be stimulated anywhere along its extension.

In all of the embodiments described above, the electrode system used for nerve stimulation had its electrodes arranged along a line. Such an arrangement is not a strict requirement, but one can use electrodes arranged in a two-dimensional array. The shape of the electrodes then has to be adapted to insure the shielding effect produced by the electrodes which are being kept at a constant potential.

The invention is not limited to the embodiments described above, but all changes and modifications thereof not constituting departures from the spirit and scope of the invention are intended to be covered by the following claims.

What is claimed is:

1. A device for applying electrical stimuli to the auditory nerve, comprising in combination:
an electrode system for placement in the vicinity of the auditory nerve and comprising a plurality of spaced insulated electrodes, there being a plurality of pairs of adjacently positioned exposed electrodes for developing separated, voltage potential gradient fields and respectively defining a plurality of insulated transmission channels, neighboring pair having one electrode of fixed potential in common;
means connected to said transmission channels for feeding to each said transmission channels pulses at a rate sufficiently low to permit recovery of a stimulated nerve before being stimulated again, whereby all the pulses for all said channels follow each other at a higher rate when taken independently from the channels to which they are fed; and
means for modulating the time-amplitude integral of each of said pulses in accordance with an audio frequency signal.

2. A device as described in claim 1, in which said electrode system includes a plurality of electrical wires spirally enmeshed and cylindrically encased in an insulating medium, but serially exposing a narrow electrical terminal point for each of the plurality of wires, said wires being electrically insulated from one another.

3. A device as set forth in claim 1, in which said electrode system includes a mosaic array of electrical terminal points imbedded in the surface of an insulating medium, each of a plurality of wires being individually connected to each terminal point.

4. A device as set forth in claim 1, in which said electrode system includes a helical wire comprised of spaced turns, a plurality of wires being individually positioned through the helix to the separate spaces between the helical turns and terminated near the curved plane coinciding with the helical circumferential surface, all of said wires being electrically insulated from one another.

5. A device as described in claim 1, which includes a plurality of matrices, said matrices being electrically driven in a controlled phase relationship.

6. A method for stimulating the human auditory nerve, comprising the steps of applying to said nerves at adjacent locations electrical voltage pulses with the period between two succeeding pulses as applied to the same location exceeding the nerve recovery time, and modulating the pulses in accordance with a sound representing signal.

7. A system for applying electrical stimuli to the auditory nerve, comprising in combination:
means for receiving an audio signal and including a neuro-potential generator for converting the audio signal into a plurality of trains of pulses, which trains of pulses together represent the audio signal, the repetition rate of the pulses in a train corresponding to a period of time longer than the recovery time of nerve fibers of the auditory nerve;
an electrode system including a plurality pairs of spaced electrodes for positioning adjacent nerve fibers of the auditory nerve, with each such pair to be positioned adjacent a different group of nerve fibers, each pair of electrodes being capable of developing an electrical gradient field upon application of an electrical signal thereto for stimulating at least some of the fibers pertaining to the associated nerve fiber groups; and
a plurality of signal transmission channels respectively connected to receive said trains of pulses, and further connected respectively to said pairs of electrodes to respectively feed the pulse trains to said pairs of electrodes as electrical signals for each pair of electrodes to develop gradient fields in response to the pulse train it receives.

8. A system as described in claim 7, said neuro-potential generator being comprised of an oscillator and a modulator for each of a plurality of channels and an amplifier.

9. A system as described in claim 7, said neuro-potential generator being comprised of a modulator for each of a plurality of channels, an oscillator-driven ring counter and an amplifier.

10. A system as set forth in calim 7, said neuro-potential generator including means for frequency modulating said pulse trains.

11. A system as set forth in claim 7, said neuro-potential generator including means for pulse width modulating said pulse trains.

12. A system as set forth in claim 7, said neuro-potential generator including means for band width modulating said pulse trains.

13. A system for electrically stimulating the auditory nerve, comprising:
means for providing an electrical signal having characteristics representative of a sound signal;
means responsive to the electrical signal and producing a train of pulses at a first rate corresponding to a period shorter than the recovery time of the nerve fibers of the auditory nerve, each pulse having characteristics representing an amplitude value of the sound signal;
means including a plurality of channels and being responsive to said pulses and distributing the pulses into said channels so that each channel receives pulses only at a second rate, corresponding to a period longer than the recovery time of said nerve fibers of the auditory nerve; and
electrode means at the output side of each said channel for positioning in proximity of a plurality of nerve fibers of the auditory nerve, so that for each pulse in a channel the electrode means is electrically energized for stimulating a plurality of nerve fibers the pulse as energizing the electrode means having characteristics that the number of nerve fibers stimulated is related to the amplitude value of the sound signal represented by the characteristics of the pulse.

14. A system for applying electrical stimuli to the auditory nerve, comprising in combination:
an electrode system including a plurality of groups of spaced electrodes for positioning adjacent nerve fibers of the auditory nerve with each such group to be positioned adjacent a different group of nerve fibers, each group of electrodes being capable of developing an electrical gradient field upon application of an electrical signal thereto for stimulating at least some of the fibers pertaining to the associated nerve fiber groups;

a plurality of signal transmission channels respectively connected to said groups of electrodes to provide to said electrodes the electrical signals respectively causing the development of the gradient fields; and means for developing a pulse train with each pulse characteristically representing an instantaneous value of an audio signal, and including means for distributing said pulse train as electrical signals into said transmission channels, so that each channel receives pulses at a rate slower than the recovery time of said nerve fibers, the frequency of the pulse train as a whole corresponding to a period shorter than said recovery time.

15. A system for applying electrical stimuli to the auditory nerve, comprising in combination:

an electrode system including a plurality of groups of spaced electrodes for positioning adjacent nerve fibers of the auditory nerve, with each such group to be positioned adjacent a different group of nerve fibers, each group of electrodes being capable of developing an electrical gradient field upon application of an electrical signal thereto for stimulating at least some of the fibers pertaining to the associated nerve fiber groups;

a plurality of signal transmission channels, each channel including a receiver to be implanted beneath skin tissue and being connected to a pair of electrodes, each said channels further including an externally positioned transmitter capable of emitting signals penetrating the skin to excite said receiver;

means for providing pulses which in sequence represent an audio signal and including;

means for cyclically feeding said pulses to said transmission channels, with two succeeding pulses in each channel following each other by a period of time which exceeds the recovery time of said nerve fibers.

No references cited.

DALTON L. TRULUCK, *Primary Examiner.*

U.S. Cl. X.R.

128—1